US010248091B2

(12) United States Patent
Viswanath et al.

(10) Patent No.: US 10,248,091 B2
(45) Date of Patent: Apr. 2, 2019

(54) METHOD AND APPARATUS FOR PROVIDING EQUIPMENT MAINTENANCE VIA A NETWORK

(71) Applicant: AT&T Intellectual Property I, L.P., Atlanta, GA (US)

(72) Inventors: Anoop Viswanath, Plano, TX (US); James Gavillet, Chicago, IL (US); Otis Jennings, Dallas, TX (US); Satya Vivek Kanakadandila, Plano, TX (US); Weiping Liu, Plano, TX (US); Brian Lois, Dallas, TX (US); Muhammad Sabir, Allen, TX (US); John Schinter, Chicago, IL (US); Christopher Tsai, Plano, TX (US); Vinu Varghese, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 364 days.

(21) Appl. No.: 15/178,188

(22) Filed: Jun. 9, 2016

(65) Prior Publication Data
US 2017/0356665 A1  Dec. 14, 2017

(51) Int. Cl.
| G06F 11/30 | (2006.01) |
| G05B 19/042 | (2006.01) |
| G05B 15/02 | (2006.01) |
| H04L 29/08 | (2006.01) |
| F24F 11/30 | (2018.01) |
| F24F 110/00 | (2018.01) |
| F24F 130/10 | (2018.01) |

(Continued)

(52) U.S. Cl.
CPC .......... *G05B 19/042* (2013.01); *G05B 15/02* (2013.01); *F24F 11/30* (2018.01); *F24F 2110/00* (2018.01); *F24F 2130/10* (2018.01); *G05B 2219/2614* (2013.01); *H04L 67/12* (2013.01); *H04W 4/33* (2018.02); *H04W 4/38* (2018.02)

(58) Field of Classification Search
CPC .................................................. G05B 19/042
See application file for complete search history.

(56) References Cited

U.S. PATENT DOCUMENTS

| 6,922,558 B2 | 7/2005 | Delp et al. | |
| 7,183,899 B2 * | 2/2007 | Behnke | G08B 25/14 340/286.01 |
| 7,664,573 B2 | 2/2010 | Ahmed | |

(Continued)

*Primary Examiner* — Phuong Huynh

(57) ABSTRACT

A method and apparatus for providing equipment maintenance are disclosed. The method receives data that is captured by at least one sensor deployed at a location, wherein the data is associated with at least one parameter of an equipment, receives atmospheric data for the location, monitors the at least one parameter of the equipment and the atmospheric data for the location, determines for the at least one parameter, whether an update to a risk measure associated with the equipment is needed, when a deviation from a baseline is detected that is greater than a threshold for a maximum deviation from the baseline, performs the update to the risk measure associated with the equipment, when the update to the risk measure associated with the equipment is needed, and generates a ticket for a remedial action based on the risk measure, when the risk measure triggers the scheduling of the remedial action.

20 Claims, 3 Drawing Sheets

(51) Int. Cl.
*H04W 4/38* (2018.01)
*H04W 4/33* (2018.01)

(56) References Cited

U.S. PATENT DOCUMENTS

| | | |
|---|---|---|
| 8,224,489 B2 | 7/2012 | Federspiel |
| 8,994,539 B2 | 3/2015 | Grohman et al. |
| 9,052,216 B2 | 6/2015 | Kamel et al. |
| 9,317,045 B2 | 4/2016 | Federspiel et al. |
| 2009/0276261 A1* | 11/2009 | Chen .................. G06Q 10/06 705/7.28 |
| 2013/0054033 A1 | 2/2013 | Casilli |
| 2014/0316594 A1* | 10/2014 | Steele .................. G05B 9/02 700/291 |
| 2014/0365017 A1 | 12/2014 | Hanna et al. |
| 2015/0019024 A1 | 1/2015 | Sabripour |
| 2015/0168926 A1 | 6/2015 | Wood |
| 2015/0241078 A1 | 8/2015 | Malhotra et al. |
| 2016/0028605 A1 | 1/2016 | Gil et al. |

\* cited by examiner

US 10,248,091 B2

METHOD AND APPARATUS FOR PROVIDING EQUIPMENT MAINTENANCE VIA A NETWORK

The present disclosure relates to a method and apparatus for providing equipment maintenance via a communications network, e.g., a communications network of a network service provider.

BACKGROUND

An enterprise may have a large number of equipment deployed in various locations, e.g., various buildings. Each building may contain any number of equipment, e.g., Heating, Ventilation, and Air Conditioning (HVAC) units, humidifiers, etc. HVAC units are equipment used for providing control of temperature and indoor air quality. Typically, building operations personnel select settings for an indoor temperature, a humidity level, an amount of ventilation, etc., via a controller. When the HVAC unit is working properly, the actual temperature and quality of indoor air should closely correlate with the environmental parameters set by the building operations personnel. When the HVAC unit fails, there may be inadequate ventilation, heating, or air conditioning. Consequently, the quality of the indoor environment may suffer. As such, the equipment, e.g., HVACs, deployed in the various locations may require scheduled maintenance for proper operation.

SUMMARY OF THE DISCLOSURE

In one embodiment, the present disclosure teaches a method and apparatus for providing equipment maintenance via a communications network. For example, the method receives data that is captured by at least one sensor deployed at a location, wherein the data is associated with at least one parameter of an equipment, wherein the equipment is deployed at the location, receives atmospheric data for the location, monitors the at least one parameter of the equipment and the atmospheric data for the location, determines for the at least one parameter of the equipment, whether an update to a risk measure associated with the equipment is needed, when a deviation from a baseline is detected that is greater than a threshold for a maximum deviation from the baseline that is established for the at least one parameter, performs the update to the risk measure associated with the equipment, when the update to the risk measure associated with the equipment is needed, and generates a ticket for a remedial action based on the risk measure associated with the equipment, when the risk measure associated with the equipment triggers the scheduling of the remedial action.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
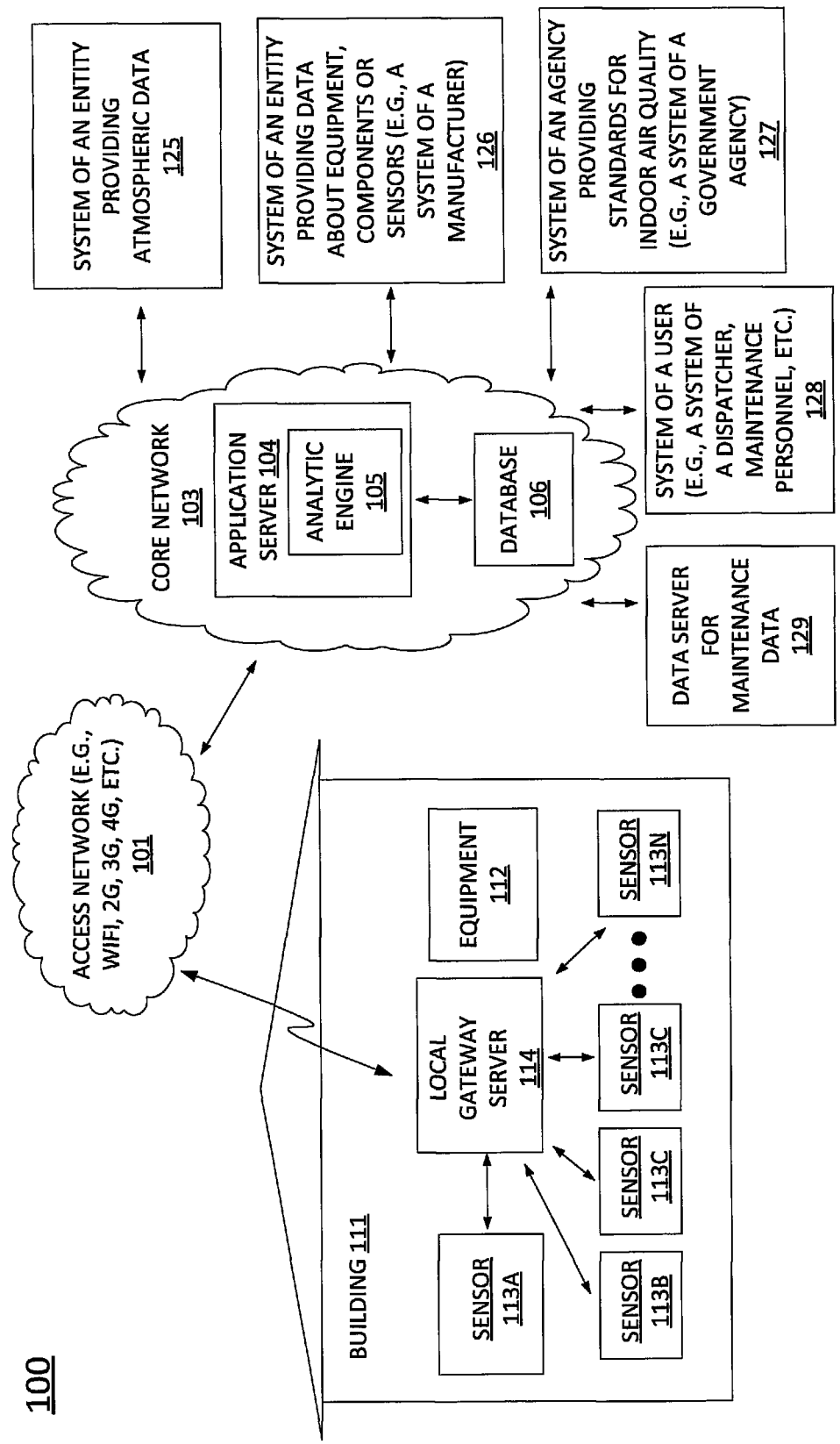
FIG. 1 illustrates an example network related to the present disclosure.

The present disclosure relates to a method and apparatus for providing equipment maintenance via a communications network, e.g., a communications network of a network service provider. The teachings of the present disclosure may be applied via any type of wired or wireless communications network.

As described above, scheduled maintenance can be provided for a large number of equipment, e.g., a large number of HVAC units, humidifiers, etc., at various equipment sites. One way for Managing the large number of equipment is by performing a scheduled maintenance in a predetermined interval, e.g., annually, semi-annually, quarterly, monthly, etc. As a result, ensuring the equipment are operating as expected will require frequent scheduled visits to the various equipment sites. For example, maintenance personnel will be periodically dispatched to each equipment site irrespective as to whether a problem actual exists at the equipment site. During some scheduled visits, the maintenance personnel may identify issues and perform repairs, whereas during some other visits, the maintenance personnel may find that all of the equipment are functioning as expected and no repair is required. This method of sending maintenance personnel to offsite locations to perform scheduled maintenance does improve reliability of the equipment but at great cost, e.g., performing preventive replacement or maintenance of equipment when no failure is actually detected. A review of maintenance records over a number of years may reveal that the frequent scheduled dispatches were probably unnecessary.

One way to reduce unnecessary dispatches of maintenance personnel is to wait for the equipment to actually fail. For example, a circuit card deployed in the HVAC system may have failed and the HVAC system can no longer maintain a temperature set for a particular environment. When this condition is determined by a tenant of a building who may report the failure, maintenance personnel may be sent to address the failure, e.g., replacing the failed circuit card. Although this approach solves the problem of unnecessary dispatches of maintenance personnel, it often creates significant inconvenience for the occupants of the building.

The present disclosure provides maintenance (i.e., equipment maintenance) for one or more equipment in a "just-in-time" approach. For each equipment, the equipment maintenance of the present disclosure is performed in a timely manner, i.e., prior to an actual failure of the monitored equipment. For each equipment, the equipment maintenance is based on a baseline that is generated for one or more parameters of the equipment.

In one embodiment, the baseline for a parameter of the one or more parameters of the equipment is generated based on one or more measurable aspects of the equipment and atmospheric data for a location at which the equipment is deployed. The location comprises a geographical location (e.g., a physical location).

In one embodiment, each parameter of the one or more parameters of the equipment is a parameter that is defined for tracking at least one measurable aspect of the equipment. In one embodiment, each measurable aspect of the at least one measurable aspect is indicative of one or more of: an efficiency of the equipment in performing at least one task of the equipment, a likelihood of a potential failure of the equipment to perform at least one task of the equipment, and a degradation of an ability of the equipment in performing at least one task of the equipment.

For an illustrative example, suppose the equipment is an air conditioner. Then, the tasks of the air conditioner may comprise: cooling a room and reducing a humidity level of a room. A measurable aspect of the equipment may be for identifying a symptom of inefficiency as to performing at least one of the tasks in the list of tasks of the air conditioner, a degradation of efficiency as to performing at least one of the tasks in the list of tasks of the air conditioner, or a likelihood of a potential failure to perform at least one of the tasks in the list of tasks of the air conditioner. The parameter may then be defined for tracking how efficiently the air conditioner is able to perform the task of cooling a room or reducing a humidity level of a room.

For example, suppose an air conditioner operating optimally runs 25% of the time to cool a room to 78° F. when the outside temperature is 90° F. Suppose, as the air conditioner becomes less efficient, the air conditioner starts running for longer periods of time. For example, it runs 50% of the time to cool the same room to 78° F. when the outside temperature is 90° F. In this example, the percentage of time that the air conditioner is running may be an appropriate measurable aspect of the air conditioner for identifying a symptom of inefficiency as to the performing of the task of air conditioning. Then, a parameter may be defined for measuring and tracking the percentage of time the air conditioner is running. As the value of the parameter that is defined for the percentage of time the air conditioner is running reaches a predetermined threshold, e.g., the air conditioner is running 50% of the time, maintenance may be performed on the air conditioner prior to an actual failure of the air conditioner. This "just-in-time" approach solves the problem of performing unnecessary preventive maintenance operations while avoiding actual failure of the equipment.

As described above, the equipment may have to perform any number of tasks. For example, an HVAC system may be used to perform the tasks of: air conditioning, heating, and air ventilating. Accordingly, a particular parameter may be defined, for the equipment, for tracking and indicating how efficiently the equipment performs each particular task. For instance, for the HVAC system, a first parameter may be for indicating how well a condenser of the HVAC system is able to perform the task of air conditioning, a second parameter may be for indicating how well a heat pump of the HVAC system is able to perform the task of heating, a third parameter may be for indicating how well a ventilation component of the HVAC system is able to perform the task of keeping the indoor air quality in a desired range, and the like.

In one embodiment, the one or more measurable aspects of the equipment are determined from various sources that comprise one or more of: a manufacturer of the equipment, a manufacturer of a component of the equipment, a subject matter expert, and an agency, e.g., a government agency. In one example, data for predicting a failure may be identified by a manufacturer of the equipment. For instance, the manufacturer may identify an increase in a coolant temperature of an HVAC system, an increase in a humidity level measured near the HVAC system, and a carbon dioxide level measured near the HVAC system, as appropriate measurable aspects for predicting a failure of the HVAC system. The measurable aspects of the equipment may then be the coolant temperature, the humidity level near the HVAC system, and the carbon dioxide level near the HVAC system.

In another example, a government agency may be tasked with providing guidance and/or standards for an indoor air quality. For instance, in the United States of America, the Environmental Protection Agency (EPA) sets standards for indoor air quality to ensure that biological, chemical and particulate levels in buildings are at levels that would not impact the satisfaction, productivity and health of the occupants. The measurable aspects of the equipment in buildings may then be based on the air quality standards set by the agency providing the guidance and/or standards, e.g., the EPA. For an illustrative example, suppose the EPA sets, for an indoor space, a maximum of 9 ppm for an average carbon monoxide level over a 24 hour period. Then, the measurable aspect is the carbon monoxide level. One or more sensors may be used to take measurements of carbon monoxide levels in a building. The carbon monoxide levels that are observed may be provided to a server in a predetermined time interval. For example, the carbon monoxide levels may be provided to an application server of a network service provider, e.g., every 10 minutes, every hour, every four hours, every day, etc. The average of the carbon monoxide levels may then be computed for a desired period of time, e.g., a period of 24 hours. If the average of the carbon monoxide levels that is computed for the 24 hour period exceeds the 9 ppm, an maintenance action may be taken. For example, maintenance personnel may be dispatched to identify a cause for the excessive level of carbon monoxide in the building and/or perform a remedial action.

As described above, for each equipment of the one or more equipment, the one or more measurable aspects of the equipment are determined from various sources. For each equipment at a location, once the one or more measurable aspects of the equipment are known, the enterprise may deploy one or more sensors for measuring each of the one or more measurable aspects of the equipment. For example, the enterprise may have deploy at the location one or more: thermometers for measuring temperature, hygrometers for measuring humidity, $CO_2$ meters for measuring carbon dioxide levels, CO meters for measuring carbon monoxide levels, and the like. A thermometer may be for capturing a temperature of a space (e.g., room) or a coolant of the equipment itself. In one embodiment, the enterprise may also deploy one or more other sensors to capture energy consumption, run times of each condenser, run times of each heat pump, volume of air flow per given time period, and the like. For illustrative example, suppose a building has two HVAC systems with a temperature of a coolant being identified as being a measurable aspect for each of the two HVAC systems. Then, for each of the two HVAC systems, the enterprise may deploy a thermometer for sensing a temperature of the coolant of the respective HVAC system.

When deployment of one or more equipment and the one or more sensors is completed for the location, the network service provider is provided with information about the one or more equipment and the one or more sensors that are deployed at the location. The information about the one or more equipment and the one or more sensors at the location may comprise one or more of: an address of a building, a latitudinal and longitudinal coordinate of the location, an altitudinal location (if applicable), electricity rate for the location, a list of the one or more equipment, a size and a capacity of each equipment, a number of units of each equipment, a lead unit designation (if applicable), a list of the one or more sensors, and information about each sensor.

In one embodiment, the information about a particular sensor of the one or more sensors at the location may comprise one or more of: a type of power source used by the particular sensor, and a type of communication used by the particular sensor for transmitting data captured by the particular sensor. For example, the particular sensor may transmit captured data to a server, e.g., an application server of a network service provider, via an access network, e.g., via a cellular network or a Wi-Fi access point. In another example, the particular sensor may transmit data captured by the particular sensor to an application server of a network service provider via a dedicated local area network (LAN). In another example, the particular sensor may transmit data captured by the particular sensor to an application server of a network service provider via a local gateway server. The local gateway server can be deployed in the vicinity of the particular sensor. For example, the particular sensor and the local gateway server may be in a same building.

In one embodiment, the network service provider or the enterprise determines a time frequency of capturing data via the one or more sensors. For example, the frequency of capturing data (i.e., performing the sensing) may be every ten minutes, every hour, etc. For illustration, a thermometer may capture a temperature of a coolant or a room every ten minutes and provide the captured temperature (i.e., temperature data) to a server, e.g., to a dedicated maintenance application server of a network service provider. In one embodiment, the captured data is aggregated over a predetermined time period prior to being provided to the server, e.g., the captured data is stored locally by the sensor for a predefined period of time to minimize the number of communication sessions with the application server. For the example above, the thermometer may capture the temperature of the coolant every ten minutes, and aggregate the temperature of the coolant that is captured for each day. At the end of each day, the temperature data that is captured and aggregated for the day may be provided to the server.

Each particular sensor has at least one way to provide the data that is captured by the particular sensor to the network service provider. In one embodiment, each particular sensor transmits the data captured by the particular sensor directly to a server, e.g., an application server, located in the communications network of the network service provider. For example, a particular sensor may have an ability to communicate with the server, e.g., the application server, via an access network, e.g., a Wireless-Fidelity (Wi-Fi) network, a cellular network (e.g., 2G, 3G, and the like), a long term evolution (LTE) network, and the like.

In one embodiment, each particular sensor of the one or more sensors transmits the data captured by the particular sensor to a local gateway server. The local gateway server is physically located near the location of the one or more sensors. For instance, the local gateway server and the one or more sensors may be located in a same building, in a same floor, or in a same room. The local gateway server gathers data from the one or more sensors and forwards the data that it gathered from the one or more sensors to a server, e.g., to the application server located in the communications network of the network service provider. For an illustrative example, if a building has five HVAC units and each HVAC unit has ten (10) sensors, it may be beneficial to have each particular sensor of the fifty (50) sensors sending data captured by the particular sensor to a local gateway server in the building. The local gateway server may then provide the data that is gathered from any number of the fifty sensors to the application server located in the communications network of the network service provider. This will again reduce the number of communication sessions with the application server of the network service provider.

In one embodiment, the local gateway server provides the data that is gathered from any number of the one or more sensors to the application server in a predetermined time interval. For example, the data that is gathered by the local gateway server may be provided to the application server every four hours, every eight hours, every day, etc. In one embodiment, the local gateway server provides the data that is gathered to the application server upon receiving a query. For instance, the application server may send a query to the local gateway server when preparing to perform an analysis on data captured via the one or more sensors at the location. Thus, the local gateway server is capable of providing the data that is gathered to the application server in a predetermined time interval and/or upon receiving an on-demand query. In other words, the local gateway server is responsive to queries from the application server in addition to being configured to provide the data that is gathered in a predetermined time interval.

In some scenarios, there may be a need to have one or more sensors deployed at a location where a power line is not readily available. Moreover, a location may not be appropriate for a connection to a Local Area Network (LAN). Thus, there may be a location where using sensors that require no power line or a connection to a LAN may be more desirable. For such a location, sensors that operate on batteries may be deployed. Then each particular sensor that operates on batteries and has no connection to a LAN may transmit data captured by the particular sensor to the server, e.g., the application server of the network service provider, via a wireless access network, e.g., via a cellular network or a W-Fi access point.

As described above, each particular sensor of the one or more sensors transmits the data that is captured by the particular sensor to a maintenance server, e.g., an application server deployed in the communications network of the network service provider. The equipment maintenance is then provided via the maintenance server, e.g., the application server. In order to provide the equipment maintenance in accordance to the teachings of the present disclosure, the application server receives the data that is captured by each of the one or more sensors. The data that is captured by the one or more sensors is associated with at least one parameter of one or more parameters of an equipment, wherein the equipment is deployed at the location.

In one embodiment, the operation of receiving the data that is captured by a particular sensor of the one or more sensors is performed via a local gateway server deployed at the location. In one embodiment, the operation of receiving the data that is captured by a particular sensor of the one or more sensors is performed directly, where the receiving of the data that is captured directly comprises receiving the data that is captured without having the data that is captured traversing a local gateway server. For example, the data that is captured may be received from the particular sensor that captured the data via a wireless access network, e.g., a cellular network or a Wi-Fi access point.

In one embodiment, the operation of receiving the data that is captured by the particular sensor of the one or more sensors is performed in a predetermined time interval. For example, the operation of receiving the data that is captured by the particular sensor may be performed every hour, every four hours, etc.

In one embodiment, the receiving of the data that is captured by the particular sensor of the one or more sensors occurs upon sending a query for obtaining the data that is captured by the particular sensor. The query may be sent either to the particular sensor or the local gateway server that gathers the data that is captured by the particular sensor.

In one embodiment, a time frequency of capturing the data by the particular sensor of the one or more sensors is determined by the network service provider. In one embodiment, a frequency of receiving the data that is captured by the particular sensor is determined by the network service provider. For illustrative example, the network service provider may determine that temperature needs to be captured every hour, humidity needs to be captured every four hours, and data that is captured by one or more sensors at the location is received every twelve hours via the local gateway server gathering the data at the location, and so on.

In addition to the data that is captured by the one or more sensors, the application server also receives atmospheric data for the location at which the one or more sensors are deployed. In one embodiment, a frequency of receiving the atmospheric data for the location is determined by the network service provider.

In one embodiment, the atmospheric data comprises one or more of: an outside temperature of the location, an outside humidity level of the location, and an outside air quality of the location. In one embodiment, the outside air quality of the location may specify a level of pollution, a level of a type of gas or chemical, a density of one or more types of particulates, and the like. For example, the level of gas may indicate a level of carbon dioxide in the air. In another example, the level of gas may indicate a level of carbon monoxide in the air. In another example, the level of gas may indicate a level of chlorine gas in the air. In one embodiment, the one or more types of particulates may comprise one or more of: dust particulates, pollen particulates, and particulates defined in terms of their size. For example, the EPA may specify an indoor air quality standard that defines a requirement for ventilation based on a diameter of a type of particulate. For instance, the requirement for ventilation may be different for particulates with diameters less than 10 micrometers versus for particulates with diameters greater than or equal to 10 micrometers. The atmospheric data for the location that is received may then include the types of particulates.

In one embodiment, the atmospheric data is received from a weather data source, e.g., a database of a national weather service. For example, in the United States of America, the National Oceanic and Atmospheric Administration (NOAA) maintains a website (e.g., weather.gov) for enabling users to receive weather information for any location in the United States of America. The application server may then receive the atmospheric data for any location in a predetermined interval and store the atmospheric data in a database of the network service provider. When the atmospheric data is needed for analysis, the atmospheric data may then readily be retrieved from the database in which it is stored.

In one embodiment, for each equipment of the one or more equipment, the application server utilizes an analytical engine for generating a baseline for each particular parameter of the one or more parameters of the equipment. The analytical engine may comprise a prediction model. The prediction model is trained using historical (i.e., known) atmospheric and performance data. In other words, from historical records associated with each equipment of the one or more equipment, the prediction model learns the relationship between the atmospheric data for the location at which the equipment is deployed and the performance data of the equipment. For example, the prediction model may learn historically (e.g., using historical data) that on days with a maximum outside temperature of greater than or equal to 90° F., the average percentage of time a particular HVAC system operates is 60%. Similarly, the predication model may learn historically, on days with a maximum outside temperature of 70° F.≤maximum outside temperature<90° F., the average percentage of time the particular HVAC system operates is 45%. Hence, from the historical records associated with the particular HVAC system, a baseline for a percentage of time the particular HVAC system is operating versus a maximum outside temperature (for a day or any portion of a day) may be generated.

Similarly, a baseline may be generated for all the other parameters of the HVAC system. For the example described above, the application server may generate: a baseline for a percentage of time the condenser is running during a 24 hour period versus the maximum outside temperature that is observed during the same 24 hour period at the location of the HVAC system, a baseline for an average coolant temperature observed during a 24 hour period versus the maximum outside temperature that is observed during the same 24 hour period at the location of the HVAC system, a baseline for a percentage of time the heat pump is running during a 24 hour period versus the minimum outside temperature that is observed during the same 24 hour period at the location of the HVAC system, a baseline for an average temperature of a heating element that is observed during a 24 hour period versus the minimum outside temperature that is observed during the same 24 hour period at the location of the HVAC system, and the like.

In turn, the application server, for each particular parameter of the equipment, establishes a threshold for a maximum deviation from the baseline that is generated for the same parameter. For example, for some deployment scenarios, how far a value of a parameter is from a value that is considered normal may be relevant.

For an illustrative example, assume a building has five HVAC systems of the same make and model, with one particular HVAC system being located in a room with several heat generating devices while the remaining four HVAC systems are in other rooms that have no heat generating devices. Assume also that the four HVAC systems are running on average 40% of the time, and the data collected on the percentage of times that the four HVAC systems are running within a range of 35% and 45%. For the particular HVAC system that is located in the room with several heat generating devices, the data collected on the percentage of time that the particular HVAC system is running may indicate that the particular HVAC is running on average 65% of the time, and the data collected on the percentage of time that the particular HVAC system is running within a range of 50% and 80%. Accordingly, for the particular HVAC system, the baseline for a percentage of time the particular HVAC system is running may be set to 65% and the threshold for the maximum deviation from the baseline for the percentage of time the particular HVAC is running may be set such that running the particular HVAC system 80% of the time would not trigger a scheduling of a maintenance action. In other words, for each particular parameter of the equipment, the baseline is generated first. Then, the threshold for the maximum deviation from the baseline is established in a manner that would not cause triggering of a maintenance action when the equipment is running at a level that is acceptable for the particular deployment scenario of the equipment. For the particular HVAC system described above, the threshold for the maximum deviation may be set to cause an action when the HVAC system is running more than 80% of the time, e.g., 85% of the time.

The application server then monitors each of the one or more parameters of the equipment and the atmospheric data for the location at which the equipment is operating. In one embodiment, the monitoring of a particular parameter of the one or more parameters comprises receiving a value of the particular parameter in a predetermined time interval. The value of each parameter of the one or more parameters that is received is processed and stored in a database.

In one embodiment, the monitoring of the particular parameter of the one or more parameters further comprises aggregating a plurality of values of the particular parameter, wherein the plurality of values of the particular parameter are received over a predetermined time for aggregation. For example, the aggregation of the data may be performed every four hours, every eight hours, every twelve hours, every day, every week, etc.

In one embodiment, the monitoring of the particular parameter of the one or more parameters comprises monitoring a parameter associated with a battery life. For example, the monitoring may be for a sensor that operates on batteries. Then, the monitoring may be for a particular parameter that tracks a battery life associated with the sensor that operates on batteries.

In one embodiment, the monitoring of the particular parameter of the one or more parameters comprises monitoring a parameter associated with signal strength of a particular sensor of the one or more sensors. For example, the signal strength of the particular sensor may be monitored when the receiving of the data that is captured by the particular sensor is performed without having the data that is captured by the particular sensor traversing a local gateway server deployed at the location.

The application server then determines, for each particular parameter of the one or more parameters of the equipment, if a deviation from the baseline that is greater than the threshold for the maximum deviation from the baseline that is established for the particular parameter is detected. For a particular parameter of the one or more parameters of the equipment, if there is a deviation from the baseline but the deviation from the baseline is less than or equal to the threshold for the maximum deviation from the baseline that is established for the particular parameter, there is no need to trigger the scheduling of an action based on the deviation that is detected. However, for the particular parameter of the one or more parameters of the equipment, if there a deviation from the baseline and the deviation from the baseline is greater than the threshold for the maximum deviation from the baseline that is established for the particular parameter, the deviation may be an indication that an potential issue with the equipment is developing. In one example, the detecting of the deviation may be useful for one or more of: assessing a risk or likelihood of a pending failure of the equipment, and triggering a scheduling of a maintenance action to be taken before a failure actually occurs. For instance, it is now possible to schedule an on-demand maintenance appointment or visit (e.g., a "just-in-time" appointment) for the equipment such that an issue that is developing with the equipment is addressed prior to an actual failure.

An actual "failure" is deemed to be a condition where the equipment is no longer able to meet the performance parameter set for the equipment. For example, an HVAC system not able to maintain a set temperature of 78° F. for a properly sized room or area when the outside temperature is 85° F. can be deemed to be an actual failure, whereas an HVAC system not able to maintain a set temperature of 72° F. when the outside temperature is 107° F. may not be deemed to be an actual failure.

In one embodiment, for each particular parameter of the one or more parameters of the equipment, when a deviation from the baseline greater than the threshold for the maximum deviation from the baseline that is established for the particular parameter is detected, the application server determines whether an update to a Risk Priority Number (RPN) (broadly a risk measure) associated with the equipment is needed. An RPN refers to a number used for prioritizing work orders and/or for dispatching maintenance personnel. For instance, the RPN may be any numerical value, e.g., a whole number, selected from one to ten, wherein in one indicates a lowest risk priority number and ten indicates a highest risk priority number. In one embodiment, the applicable values for the RPN may be determined by the network service provider. It is noted that the numbers above (i.e., one through ten) are examples and are not intended to be a limitation on the present disclosure.

In one embodiment, for each particular parameter of the one or more parameters of the equipment, the update to the RPN associated with the equipment is needed when the deviation from the baseline greater than the threshold for the maximum deviation from the baseline that is established for the particular parameter is sustained for a time interval greater than or equal to a predetermined length of time for such sustained deviation. If the deviation, described above, is sustained for a time interval greater than or equal to the predetermined length of time for sustained deviation, then the RPN associated with the equipment may be incremented, e.g., from one to two, and then to three, and so on. For example, if an undesirable situation (e.g., a degradation of performance) with the equipment is progressing in a negative manner (e.g., the condition is getting worse or deteriorating), the RPN may be incremented. The RPN may be incremented until it reaches a maximum value for the RPN. In another example, a previously detected undesirable situation may improve. Accordingly, when an improvement is detected, the RPN may be decremented.

In one embodiment, for each particular parameter of the one or more parameters of the equipment, if the deviation from the baseline that is greater than the threshold for the maximum deviation from the baseline that is established for the particular parameter is not detected for a predetermined time interval for resetting the risk priority number associated with the equipment, the risk priority number is reset to a lowest value of the risk priority number associated with the equipment. For illustration, suppose the predetermined time interval for resetting the risk priority number is a week. Then, if no deviation from the baseline greater than the respective threshold for the maximum deviation from the baseline that is established for the particular parameter is detected for any given week, the risk priority number associated with the equipment may be reset to its lowest value, e.g., to one.

The application server then determines whether the current value of the RPN for an equipment will trigger a remedial action. For example, the RPN may have reached a threshold for generating a ticket for taking an action. The application server generates the ticket when the RPN triggers a remedial action. In one embodiment, the ticket may be for dispatching maintenance personnel. In one embodiment, the ticket may be for making an adjustment to an existing maintenance schedule. For example, the existing maintenance schedule may indicate that maintenance personnel will be visiting the equipment site in ten days. However, the current value of the RPN may indicate that an issue is developing with the equipment and remediation within the next three days is more appropriate. Then, the ticket may be generated to make adjustments to a maintenance schedule and to ensure that a maintenance visit to the location of the equipment occurs within the next three days.

In one embodiment, the application server sends the ticket that is generated to a system or a user. For example, the user may be an individual or an organization responsible for maintenance of the equipment or dispatching of maintenance personnel. The application server then continues monitoring each of the one or more parameters of the equipment.

FIG. 1 illustrates an example network 100 related to the present disclosure. In one illustrative embodiment, the network 100 may comprise a building 111 (broadly any enclosed environment), an access network 101, a core network 103, a system 125 (e.g., a server) of an entity that provides atmospheric data, a system 126 (e.g., a server) of an entity that provides data about equipment, components of equipment and/or sensors, a system 127 (e.g., a server) of an agency that provides various standards such as indoor air quality and the like, a system 128 (e.g., a server) of a user, e.g., a system of a dispatcher or maintenance personnel, and a database server 129 containing equipment maintenance data. For example, records on maintenance of equipment may be stored in the database 129.

The access network 101 may comprise a Wireless-Fidelity (Wi-Fi) network, a cellular network (e.g., 2G, 3G, and the like), a long term evolution (LTE) network, and the like. The core network 103 may comprise any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 3:
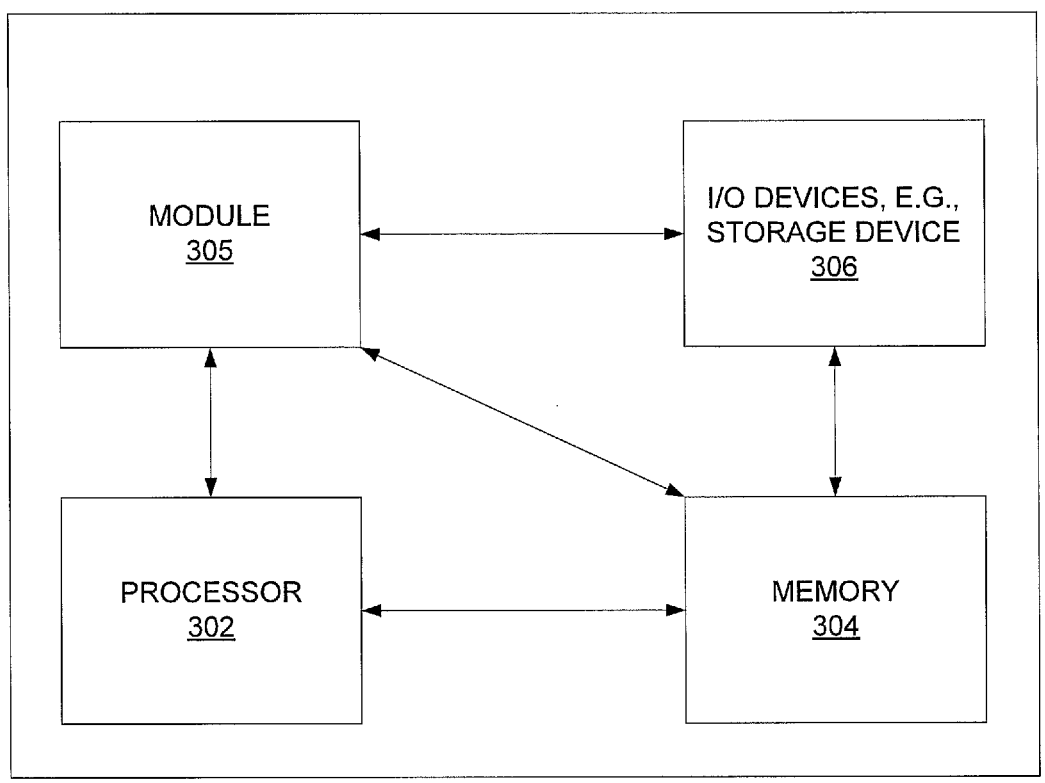
FIG. 3 depicts a high-level block diagram of a computer suitable for use in performing the functions described herein.

In one embodiment, the building 111 comprises an equipment 112, one or more sensor devices 113a-113n, and a local gateway server 114. In one embodiment, the core network 103 may include an Application Server (AS) 104 and a database server 106. In one embodiment, the AS 104 is configured to perform the methods and functions described herein (e.g., the method 200 discussed below). For example, the AS 104 may be deployed as a hardware device embodied as a dedicated server (e.g., the dedicated computer 300 as illustrated in FIG. 3). In other words, the AS 104 is for providing equipment maintenance in accordance with the teachings of the present disclosure. The application server 104 may comprise an analytic engine 105. The application server 104 may be communicatively coupled with the database server 106.

In one embodiment, the database server 106 may be used for storing data gathered from various internal and external sources. For example, atmospheric data gathered from the system 125, equipment and sensor data gathered from the system 126, standards for indoor air quality gathered from the system 127, and maintenance data gathered from the database 129, may be stored in the database server 106. The application server 104 may then access the data gathered from the various internal and external sources when performing an analysis, generating a baseline, and providing the equipment maintenance.

In one embodiment, the one or more sensor devices 113a-113n may communicate with the application server 104 via the local gateway server 114 and the access network 101. In one embodiment, the one or more sensor devices 113a-113n may communicate with the application server 104 directly via an access network, e.g., via a cellular network or a Wi-Fi access point. A sensor device is said to be communicating directly via an access network when the communication occurs without the use of the local gateway server, e.g., the local gateway server 114.

It should be noted that the network 100 may include additional networks and/or elements that are not shown to simplify FIG. 1. For example, the access network and the core network of FIG. 1 may include additional network elements (not shown), such as for example, base stations, border elements, gateways, firewalls, routers, switches, call control elements, various application servers, and the like. In addition, the building 111 may include any number of equipment (e.g., HVAC systems), sensors, local gateway servers, etc.

Although a single database is shown in core network 103 of FIG. 1, the various types of data may be stored in any number of databases. For instance, various databases, e.g., a database for equipment, a database for sensors, a database for standards, a database for guidance for indoor air quality, a database for atmospheric data, a database for building and equipment maintenance data, a database for battery life of sensors, etc., may be used. In addition, the various types of data may also be stored in a cloud storage. In other words, the network service provider may implement the service for providing equipment maintenance of the present disclosure by utilizing distributed sensor devices and storing data in a cloud storage and/or a centralized server.

In one embodiment, the AS 104 is used for implementing the present method for providing equipment maintenance. The AS 104 of the present disclosure is for receiving, for each particular sensor of one or more sensors at a location, data that is captured by the particular sensor, wherein the data that is captured by the particular sensor is associated with at least one parameter of one or more parameters of an equipment, wherein the equipment is deployed at the location, for receiving atmospheric data for the location, for monitoring each particular parameter of the one or more parameters of the equipment and the atmospheric data for the location, for determining, for each particular parameter of the equipment, if an update to a risk priority number associated with the equipment is needed, when a deviation from a baseline greater than a threshold for a maximum deviation from the baseline that is established for a particular parameter is detected, for performing the update to the risk priority number associated with the equipment, when the update to the risk priority number associated with the equipment is needed, and for generating a ticket for a remedial action based on the risk priority number associated with the equipment, when the risk priority number associated with the equipment causes a remedial action.

Figure 2:
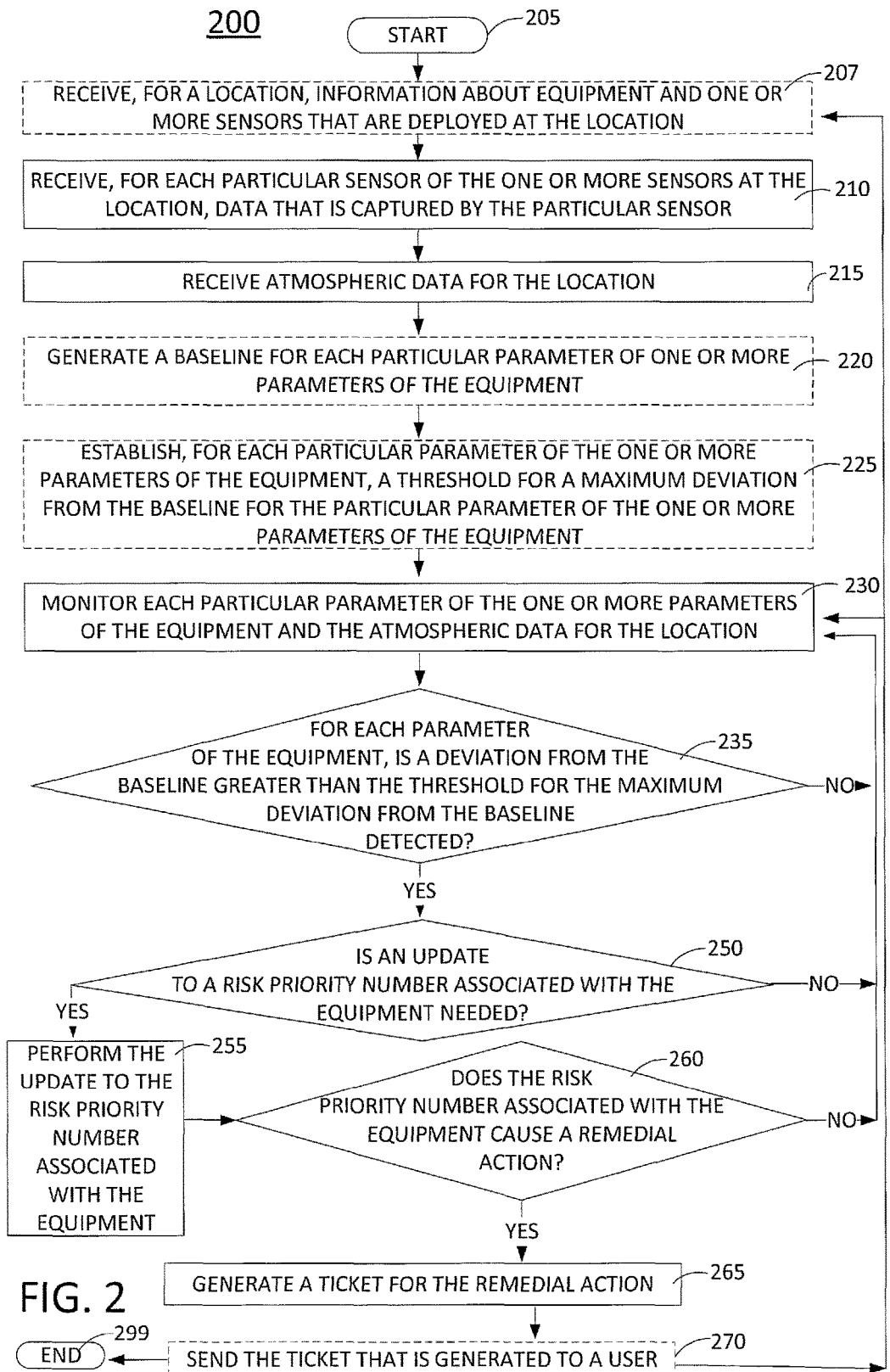
FIG. 2 illustrates a flowchart of an example method for providing equipment maintenance.

FIG. 2 illustrates a flowchart of an example method 200 for providing equipment maintenance in accordance with the present disclosure. In one embodiment, the method 200 may be implemented in an application server, e.g., an application server 104, or the processor 302 as described in FIG. 3.

The method 200 may be implemented for any number of locations and any number of equipment at each location. For example, the AS 104 may be used for a plurality of locations of an enterprise, with any number of equipment being maintained via the AS 104 at each location of the enterprise. For clarity, the flowchart of the example method 200 is described herein for each equipment. However, the method may be performed for any number of equipment in parallel. The method 200 starts in step 205 and proceeds to step 207.

In optional step 207, the processor receives, for a location, information about equipment to be maintained and one or more sensors that are deployed at the location. For example, for the location, the processor may receive, a physical location of each equipment and each sensor, a lead unit designation (if applicable), a type of communication for each sensor of the one or more sensors, etc.

In step 210, the processor receives, for each particular sensor of the one or more sensors at the location, data that is captured by the particular sensor of the one or more sensors, wherein the data that is captured by the particular sensor of the one or more sensors is associated with at least one parameter of one or more parameters of an equipment, wherein the equipment is deployed at the location.

In one embodiment, each particular sensor of the one or more sensors is for capturing the data that is received from the particular sensor, wherein the data that is captured by the particular sensor is associated with at least one parameter of the one or more parameters of the equipment.

In one embodiment, each particular parameter of the one or more parameters of the equipment is a parameter that is defined for tracking one or more measurable aspects of the equipment. In one embodiment, a measurable aspect of the one or more measurable aspects of the equipment may be for tracking at least one of: a percentage of time the equipment is running, a percentage of time a component of the equipment is running, a temperature of the location at which the equipment is deployed, and a temperature of a component of the equipment.

In step 215, the processor receives atmospheric data for the location. For example, the processor receives atmospheric data from a weather data source, e.g., a database of a national weather service.

In optional step 220, the processor generates a baseline for each particular parameter of the one or more parameters of the equipment.

In optional step 225, the processor, for each particular parameter of the one or more parameters of the equipment, establishes a threshold for a maximum deviation from the baseline that is generated for the particular parameter of the one or more parameters of the equipment. For example, if there are five HVAC systems in a building and three parameters are to be monitored for each HVAC system, fifteen baselines are generated, one baseline for a particular parameter of a particular HVAC system. Then, for each of the fifteen baselines, a threshold for a maximum deviation from the baseline (i.e., the baseline of the respective parameter) is established.

In step 230, the processor monitors each particular parameter of the one or more parameters of the equipment and the atmospheric data for the location. For example, the processor may monitor a temperature, a humidity level, and so on for the location. For the example above, each of the fifteen particular parameters at the location is monitored. In addition, the atmospheric data for the location at which the five HVAC systems are deployed is monitored.

In step 235, the processor determines, for each particular parameter of the one or more parameters of the equipment, whether a deviation from the baseline greater than the threshold for the maximum deviation from the baseline that is established for the particular parameter is detected. If the deviation from the baseline greater than the threshold for the maximum deviation that is established for the particular parameter is detected, the processor proceeds to step 250. Otherwise, the processor proceeds to step 230.

In step 250, the processor determines whether an update to a risk priority number associated with the equipment is needed. If the processor determines an update to the risk priority number associated with the equipment is needed, the processor proceeds to step 255. Otherwise, the processor proceeds to step 230.

In step 255, the processor performs the update to the risk priority number associated with the equipment. For example, the risk priority number associated with the equipment may be incremented when a situation at the location deteriorates or progresses negatively. Similarly, when an improvement in a previously known situation is detected, the risk priority number associated with the equipment may be decremented.

In step 260, the processor determines whether the risk priority number associated with the equipment causes or triggers a remedial action to be taken. For example, the risk priority number associated with the equipment may have reached a threshold for generating a ticket, e.g., a maintenance ticket. If the risk priority number associated with the equipment causes the remedial action, the processor proceeds to step 265. Otherwise, the processor proceeds to step 230.

In step 265, the processor generates a ticket for the remedial action to be performed. The ticket is based on the risk priority number associated with the equipment. In one embodiment, the processor generates the ticket for dispatching maintenance personnel to the location of the equipment. In one embodiment, the processor generates the ticket for updating a maintenance schedule. For example, the updating of the maintenance schedule may be for performing maintenance at an earlier time than previously scheduled. In another example, the updating of the maintenance schedule may be for performing maintenance at a later time than previously scheduled.

In optional step 270, the processor sends the ticket that is generated to a user or a system. For example, the ticket may be sent to an individual or a system responsible for maintenance of the equipment at the location or dispatching of maintenance personnel to the location. The processor then proceeds either to step 207 to receive information, to step 230 to continue monitoring, or to step 299 to end the process.

It is important to note that the equipment (types and quantities), the measurable aspects, types of sensors, the types of measurements that are to be performed, the types of computations that are performed, the length of time used for comparisons, etc. are not intended to limit the applicability of the teachings of the present disclosure. For example, the local gateway server may comprise a 900 MHz 3G cellular network gateway server or any other gateway server. The sensors may comprise a temperature sensor (e.g., one or more sensors for measuring air or space temperature, for measuring discharge line temperature, for measuring air supply line temperature, for measuring suction line temperature, for measuring discharged condenser air temperature and the like), a humidity sensor, a timer for run times, a discharge sensor (e.g., for air, for fluid, and the like), etc. The measurements may be absolute measurements, or measurements of differences between predicted and actual values obtained via sensors. In addition, the computed values (e.g., the RPN) may be modified for ease in understanding and/or change a scale of results. For instance, a smoothing function may be applied on computed values for providing results within a given range. For example, the RPN may be provided in a range of one to ten, a geometric weight may be applied to take into account a deviation being sustained for a longer time, etc.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

As such, the present disclosure provides at least one advancement in the technical field of equipment maintenance. For instance, in one example, the present disclosure provides a server and a communication network that is able to analyze data collected from various sources to identify predict equipment issues and generate a ticket, e.g., for a dispatch of personnel for a preventative action or for adjusting a schedule of a previously scheduled maintenance of the equipment.

Although the above disclosure was discussed in the context of an HVAC system, other types of equipment deployed in a building can also benefit from the monitoring methods of the present disclosure. For example, sophisticated medical equipment or laboratory equipment used in a hospital or a laboratory can also use the monitoring methods of the present disclosure.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for providing equipment maintenance, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or each of the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 305 for providing equipment maintenance (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for providing equipment maintenance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
receiving, via a processor of a communications network operated by a network service provider, data that is captured by at least one sensor deployed at a location, wherein the data is associated with at least one parameter of an equipment, wherein the equipment is deployed at the location;
receiving, via the processor, atmospheric data for the location;
monitoring, via the processor, the at least one parameter of the equipment and the atmospheric data for the location;
determining, via the processor, for the at least one parameter of the equipment, whether an update to a risk measure associated with the equipment is needed, when a deviation from a baseline is detected that is greater than a threshold for a maximum deviation from the baseline that is established for the at least one parameter;

performing, via the processor, the update to the risk measure associated with the equipment, when the update to the risk measure associated with the equipment is determined to be needed; and generating, via the processor, a ticket for a remedial action based on the risk measure associated with the equipment, when the risk measure associated with the equipment triggers a scheduling of the remedial action.

2. The method of claim 1, further comprising:
generating, via the processor, the baseline for the at least one parameter; and
establishing, via the processor, the threshold for the maximum deviation from the baseline for the at least one parameter of the equipment.

3. The method of claim 1, further comprising:
sending, via the processor, the ticket that is generated to a system for scheduling the remedial action.

4. The method of claim 1, wherein the generating the ticket is for dispatching maintenance personnel to the location.

5. The method of claim 1, wherein the generating the ticket is for updating a maintenance schedule for the location.

6. The method of claim 1, wherein the at least one parameter is a parameter that is defined for tracking one or more measurable aspects of the equipment.

7. The method of claim 6, wherein a measurable aspect of the one or more measurable aspects of the equipment is for tracking at least one of: a percentage of time the equipment is operating, a percentage of time a component of the equipment is operating, a temperature of the location at which the equipment is deployed, and a temperature of a component of the equipment.

8. The method of claim 1, further comprising:
receiving, via the processor, information about the equipment and the at least one sensor deployed at the location.

9. The method of claim 1, wherein the data is received from a local gateway server deployed at the location.

10. The method of claim 1, wherein the data is received directly from the at least one sensor without the data traversing over a local gateway server deployed at the location.

11. The method of claim 1, wherein the data is received in a predetermined time interval.

12. The method of claim 1, wherein the data is received in response to a query directed to the at least one sensor.

13. The method of claim 1, wherein a frequency of receiving the data is determined by the network service provider.

14. The method of claim 1, wherein a frequency of capturing the data by the at least one sensor is determined by the network service provider.

15. The method of claim 1, wherein the atmospheric data comprises one or more of: an outside temperature of the location, an outside humidity level of the location, and an outside air quality of the location.

16. The method of claim 1, wherein the monitoring of the at least one parameter of the equipment and the atmospheric data for the location comprises:
receiving, via the processor, a value of the at least one parameter in a predetermined time interval.

17. The method of claim 16, wherein the monitoring of the at least one parameter of the equipment and the atmospheric data for the location further comprises:
aggregating, via the processor, a plurality of values of the at least one parameter, wherein the plurality of values of the at least one parameter is received over a predetermined time for aggregation.

18. The method of claim 1, wherein the monitoring of the at least one parameter of the equipment and the atmospheric data for the location comprises:
monitoring, via the processor, a parameter associated with a battery life.

19. A non-transitory computer-readable storage device storing a plurality of instructions which, when executed by a processor of a communications network operated by a network service provider, cause the processor to perform operations, the operations comprising:
receiving data that is captured by at least one sensor deployed at a location, wherein the data is associated with at least one parameter of an equipment, wherein the equipment is deployed at the location;
receiving atmospheric data for the location;
monitoring the at least one parameter of the equipment and the atmospheric data for the location;
determining for the at least one parameter of the equipment, whether an update to a risk measure associated with the equipment is needed, when a deviation from a baseline is detected that is greater than a threshold for a maximum deviation from the baseline that is established for the at least one parameter;
performing the update to the risk measure associated with the equipment, when the update to the risk measure associated with the equipment is determined to be needed; and
generating a ticket for a remedial action based on the risk measure associated with the equipment, when the risk measure associated with the equipment triggers a scheduling of the remedial action.

20. An apparatus comprising:
a processor of a communications network operated by a network service provider; and
a computer-readable storage device storing a plurality of instructions which, when executed by the processor, cause the processor to perform operations, the operations comprising:
receiving data that is captured by at least one sensor deployed at a location, wherein the data is associated with at least one parameter of an equipment, wherein the equipment is deployed at the location;
receiving atmospheric data for the location;
monitoring the at least one parameter of the equipment and the atmospheric data for the location;
determining for the at least one parameter of the equipment, whether an update to a risk measure associated with the equipment is needed, when a deviation from a baseline is detected that is greater than a threshold for a maximum deviation from the baseline that is established for the at least one parameter;
performing the update to the risk measure associated with the equipment, when the update to the risk measure associated with the equipment is determined to be needed; and
generating a ticket for a remedial action based on the risk measure associated with the equipment, when the risk measure associated with the equipment triggers a scheduling of the remedial action.

\* \* \* \* \*